United States Patent [19]

Payne

[11] 4,002,139
[45] Jan. 11, 1977

[54] STRAIN INDICATOR
[76] Inventor: William J. Payne, 1328 Clearview Drive, Greensburg, Pa. 15601
[22] Filed: Feb. 5, 1976
[21] Appl. No.: 655,495

Related U.S. Application Data
[63] Continuation of Ser. No. 494,638, Aug. 5, 1974, abandoned.

[52] U.S. Cl. .................. 116/114 R; 73/88 F; 85/62
[51] Int. Cl.² .......................................... G01B 5/30
[58] Field of Search .............. 116/114 R, DIG. 34; 73/88 F, 88 E, 88 A; 85/62, 1 R, 1 T

[56] References Cited
UNITED STATES PATENTS

| | | | |
|---|---|---|---|
| 3,602,186 | 8/1971 | Popenoe | 116/114 R |
| 3,749,108 | 3/1974 | Mosow | 116/114 R |
| 3,850,133 | 11/1974 | Johnson | 116/114 R |
| 3,964,299 | 6/1976 | Johnson | 116/DIG. 34 |

Primary Examiner—Richard C. Queisser
Assistant Examiner—Denis E. Corr
Attorney, Agent, or Firm—Fay & Sharpe

[57] ABSTRACT

A strain indicator of the type wherein a change in length of a strain member produces a change in color of a visual indicator. An indicator area and a light-absorbing indicator fluid are encapsulated in a member that also includes a window. The capsule is fastened to the strain member with an adhesive. A change in length of the strain member causes the indicator area to become separated from the window with the result that light-absorbing indicator fluid is caused to flow between the indicator area and the window.

17 Claims, 8 Drawing Figures

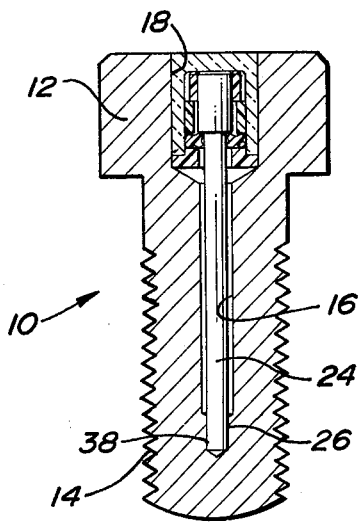
FIG. 1
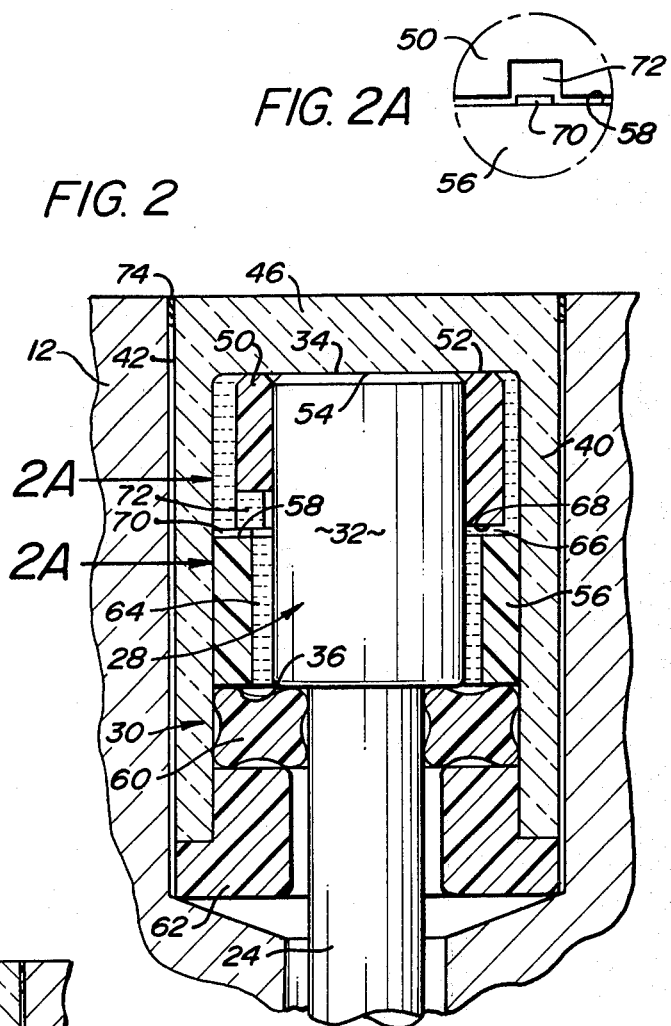
FIG. 2
FIG. 2A
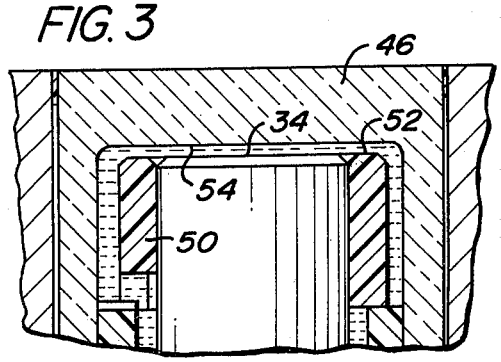
FIG. 3
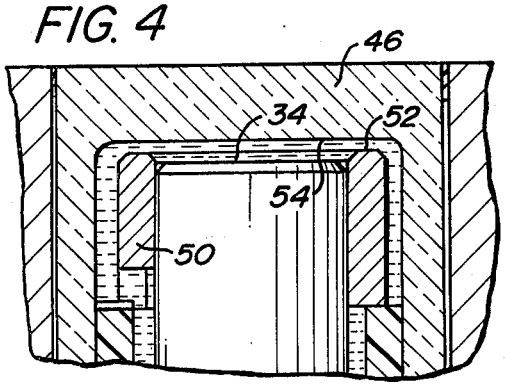
FIG. 4
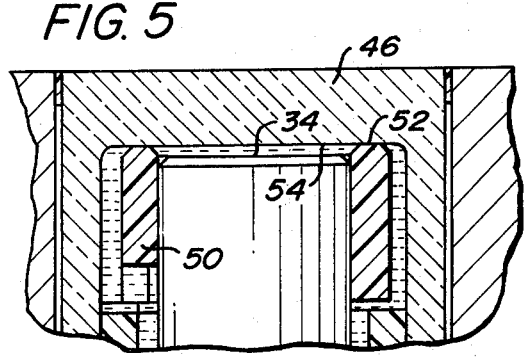
FIG. 5

STRAIN INDICATOR

This is a continuation of application Ser. No. 494,638, filed Aug. 5, 1974.

REFERENCE TO RELATED APPLICATIONS AND PATENTS

U.S. Pat. No. 3,799,108 describes and claims a fluid type strain indicator. This patent is owned by the assignee of this application, Modulus Corporation. U.S. letters patent applications Ser. Nos. 310,445 filed Nov. 29, 1972 (now U.S. Pat. No. 3,850,133); 479,274 abandoned filed June 14, 1974; and 481,042 filed June 20, 1974 (now U.S. Pat. No. 3,964,299); all assigned to Modulus Corporation, describe and claim fluid type strain indicators. U.S. letters patent application Ser. No. 508,211 filed Sept. 23, 1974 (now U.S. Pat. No. 3,908,508) describes and claims a mechanical strain indicator. This application is also owned by Modulus Corporation.

BACKGROUND OF THE INVENTION

This invention relates to strain indicators of the type shown in U.S. Pat. Nos. 3,602,186 and 3,799,108. More particularly, this invention relates to a strain indicator apparatus of the type wherein a change in length of a strain member produces a change in color of a visual indicator.

In many assembly operations where fastening devices are used it is desirable to inspect the assembled fastener to determine that it has been taken up an appropriate amount. The fastener may be, for example, a stud, a bolt, a rivet or the like.

Several prior art techniques have been utilized for determining when a fastener has been properly taken up. One such technique involves the use of a torque wrench in which a specified number of foot pounds may be verified as having been applied to a fastener in the assembly thereof. Other prior art techniques have made use of the fact that take-up of a fastener will set up certain stress levels in the fastener which may be measured as, for instance, by means of stress sensitive material. Still further prior art techniques have made use of the fact that take-up of a fastener produces an elongation of the fastener which may be measured utilizing well known techniques such as direct measuring devices.

The above examples demonstrate that fastener take-up may be measured by determining either torque, stress or strain values in a fastener.

Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress and strain may be used interchangeably. The device of this invention is termed a strain indicator because the elongation of the fastener is being sensed in order to determine a fully made-up condition of the fastener. The term strain indicator should not be considered as limiting since in its broadest sense the device of this invention may be considered a stress or torque indicator as well. In U.S. Pat. Nos. 3,602,186 and 3,799,108 there are shown and described strain indicators of the type wherein a change in length of the fastener causes an indicator area of a pin to separate from a window with the result that light-absorbing indicator fluid is caused to flow between the indicator area and the window.

This invention is directed to an improved strain indicator of the type wherein a change in length of the fastener produces a visual indication at the head of the fastener.

SUMMARY OF THE INVENTION

Briefly summarized, the strain indicator of this invention comprises a threaded bolt having a bore extending from the bolt head into the body. A pin member is received within the bore. The inner end of the pin member is fixed to the fastener by means of an adhesive. The free end of the pin member is received within and made a part of a fluid holding member which itself is attached to the fastener. The fluid holding member is comprised of a generally cylindrical lens cup which includes a window, a retainer and a seal. A brightly colored indicator area is provided at the end of the pin member and is adapted to be disposed adjacent the window of the capsule. The capsule is filled with light-absorbing indicator fluid. A stop shoulder is provided internally of the capsule in order to coact with a sleeve disposed about the end of the pin member. As the length of the threaded fastener is changed, the indicator area separates from the window with the result that light-absorbing indicator fluid is caused to flow between the indicator area and the window. The fluid absorbs the color of the indicator area giving a visual indication that proper take-up of the fastener has been accomplished.

If the elongation of the fastener is elastic the pin member and the sleeve disposed about the pin member will be displaced as a single unit. In the event that the fastener should become loosened (with the fastener in an elastic condition) both the pin member and the sleeve will return to their original position.

If, however, the elongation of the fastener exceeds the elastic limit of the fastener material (i.e., the fastener is over torqued) the sleeve member received about the pin member will abut the internal stop surface of the capsule. Further movement of the pin member will result in an unequal displacement of the pin member and the sleeve with respect to the window. There will thus be presented a visual indication of an overstretching of the fastener.

Should the overstretched fastener become loosened, both the pin member and the sleeve received thereabout will move toward the window. The sleeve, however, will return to a position in contact with the window whereas the pin will not. There will thus be presented a visual indication of a loosened condition of an overstretched fastener.

In a modified form of the invention the pin member and the sleeve received thereabout are provided with interengaging tapered surfaces such that when a predetermined strain has been exceeded in the fastener the sleeve will be released from the pin member at such time as the predetermined strain has been exceeded thus giving a visual indication of an overstretching of the fastener.

BRIEF DESCRIPTION OF THE DRAWINGS

A more complete description of the invention will now be made with reference to the accompanying drawings in which:

FIG. 1 is an elevational cross-sectional view of a fastener incorporating the indicating feature of this invention;

FIG. 2 is an enlarged fragmentary elevational cross-sectional view of the indicator portion of the apparatus of this invention with the fastener in an unstressed condition;

FIG. 2a is an enlarged fragmentary elevational cross-sectional view showing the relationship of the indicator sleeve to the shim of the indicator portion of the apparatus of this invention;

FIG. 3 is an enlarged fragmentary elevational cross-sectional view of the indicator portion of the apparatus of this invention with the fastener in a stressed condition within the elastic limit of the fastener material;

FIG. 4 is an enlarged fragmentary elevational cross-sectional view of the indicator portion of the apparatus of this invention with the fastener in a stress condition, the elastic limit of the fastener material having been exceeded during take-up;

FIG. 5 is an enlarged fragmentary elevational cross-sectional view of the indicator portion of the apparatus of this invention with the fastener in an unstressed condition after the elastic limit of the fastener has been exceeded during take-up;

DESCRIPTION OF THE PREFERRED EMBODIMENT

Figure 6:
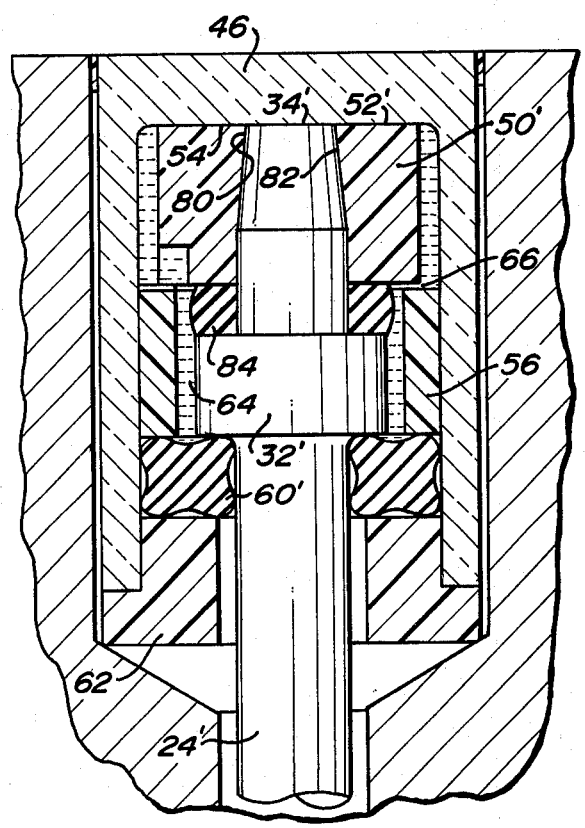
FIG. 6 is an enlarged fragmentary elevational cross-sectional view of a modification of the indicator portion of the apparatus of this invention with the fastener in an unstressed condition.

Turning now to FIG. 1, the apparatus of this invention includes a fastener 10 having a head 12 and external threads 14. Head 12 may be in any desired configuration making it possible to turn the fastener with a suitable tool such as a wrench.

An axial bore 16 is drilled from the head of the fastener a substantial distance into the fastener body. A counterbore 18 is provided at the head 12 in order to receive the indicator unit as will be described more fully hereafter.

As shown in FIG. 1, pin member 24 is provided with a first end 26 adapted to be received within the bore 16 and a second end 28 (FIG. 2) adapted to be received within the fluid holding member or capsule of the indicator unit. End 26 of pin member 24 is fastened to the wall defining the bore 16 of the fastener by means of an adhesive 38 which is applied to either one or both of the surfaces of the pin member 24 and the wall defining bore 16 prior to assembly. Alternate structures for securing the pin member 24 to the interior wall of the fastener 10 should be considered within the spirit of this invention including, but not limited to, screw threads or a press fit.

As is shown more clearly in FIG. 2, the second end 28 of pin member 24 includes a head portion 32 and an indicator area 34 which is a brightly colored planar surface of the head portion disposed essentially transverse to the axis of the pin member 24. The color selected for the indicator area 34 is preferably a highly visible coating of red-orange. As will be apparent as the description proceeds, other colors may be selected depending upon particular conditions.

A shoulder 36 is defined at the head portion 32 the purpose of which will be described more fully hereafter with respect to the sealing structure of the capsule.

Capsule 30 is a fluid holding member defined by a lens cup 40 having a side wall 42 and an outer wall which defines a clear window 46.

It should be appreciated that the entire lens cup 40 of FIG. 2 is substantially clear in order that the upper wall may function as a window or lens through which fluid within the capsule may be observed. It should be appreciated that in alternate embodiments it is not necessary that the entire lens cup 40 be clear since it is possible to provide structures in which a translucent window or lens is attached to an opaque side wall.

Received about the second end 28 of pin member 24 is an indicator sleeve 50 having an indicator area 52. Sleeve 50 is lightly pressed about the end of pin member 24 so that it is capable of relative movement with respect to the pin member if excessive force is applied to the sleeve in a manner to be described more fully hereafter. Thus it should be understood that the indicator sleeve 50 is not rigidly or firmly attached to the pin member although these members will move together as described below.

The upper surfaces of both the pin member 24 and the indicator sleeve 50 (as shown in FIG. 2) are flat and are essentially coplanar. Thus the indicator area 34 of the pin member is in substantial alignment with the indicator area 52 of the sleeve 50. Both of these indicator areas are thus complementary to the internal surface 54 of the window 46.

Disposed within the interior of the capsule is an abutment sleeve 56 defining an abutment or stop surface 58 (FIG. 2a).

It should be understood that abutment sleeve 56 is fixed to the internal surface of the lens cup 40 in a preset location as will be described more fully hereafter. In the preferred embodiment adhesive is used to secure the abutment sleeve 56 to the lens cup although it should be understood that other attachment means such as ultrasonic welding, screw threads, etc. should be considered within the scope of this invention.

Disposed immediately below the abutment sleeve 56 as shown in FIG. 2 is ring 60. In the preferred embodiment of FIG. 2 element 60 is a quadring which performs both a sealing and a biasing function as will be described more fully below.

Ring 60 is held in place by means of a retainer 62 which is secured to the lens cup, in the embodiment of FIG. 2, by means of adhesive applied to either one or both of the surfaces of the retainer or the lens cup. In alternate embodiments it should be noted that other attachment means such as ultrasonic welding, screw threads, etc. may be used within the scope of this invention.

The interior space of the fluid holding member or capsule is filled with a light-absorbing indicator fluid 64. Fluid 64 essentially fills all of the free space within the capsule within the sealed volume.

The ring 60 functions to provide sealing at the pin member 24 in order to prevent the escape of light-absorbing indicator fluid 64 from the capsule. The ring also functions to provide a bias or compressive reaction force to shoulder 36 of the pin member in order to bias the head portion 32 of the pin member in an upward direction as shown in FIG. 2 such that the indicator area 34 of the pin member is maintained in contact with the internal surface 54 of the window 46.

It should be understood, therefore, that in the position shown in FIG. 2 the fastener is in a nonstressed condition with the indicator area 34 of the pin member in contact with the window due to the bias exerted on the pin by the ring 60. Thus there is no fluid between the pin and the window and, as a result, the brightly colored surface of the indicator area 34 is clearly visible through the window 46.

Similarly, the indicator sleeve 50 which is somewhat lightly pressed about the end of the pin member 24 is in contact with the internal surface 54 of the window 46 in the configuration shown in FIG. 2. The indicator area 52 of the indicator sleeve is thus clearly visible through the window 46.

As indicated previously the color selected for the indicator area 34 of the pin member is, in the preferred embodiment, a bright red-orange. The same or a different color may be utilized for the indicator area 52 of the sleeve 50. As the description proceeds it will become apparent that there are several options available to the manufacturer of this invention with respect to the colors presented by the indicator. Therefore, the selection of a particular color or a combination of colors should not be considered as controlling.

Turning once again to FIG. 2 it will be noted that a clearance space 66 is defined between the abutment surface 58 of sleeve 56 and surface 68 of sleeve 50. Clearance 66 is closely controlled and is preestablished as a design function of the indicator in order that there may be established a visual indication of an over torque or overstressed condition in the fastener.

Before describing the operation of the overstress feature of the indicator of this invention a brief reference will be made to the assembly of the indicator in order to provide for the establishment of the precise clearance space 66.

In assembly the indicator sleeve 50 is received about the end of the pin member. As previously has been noted these members are not firmly fixed to one another as sleeve 50 is capable of relative movement with respect to the pin upon application of a predetermined force. After the end of the pin member (including sleeve 50) is disposed within the lens cup 40 the abutment surface 58 of sleeve 56 is provided with an adhesive backed shim 70. The thickness of shim 70 will determine the clearance space 66. With the end of the pin member and the sleeve 50 disposed within the lens cup (the end surfaces of these elements being coplanar) the abutment sleeve 56 is inserted in the lens cup until shim 70 (which is adhered to the sleeve 56) contacts the surface 68 of sleeve 50. Once shim 70 contacts surface 68 of sleeve 50 (with indicator area 52 of sleeve 50 and indicator area 34 of pin member 24 contacting surface 54 of the window) sleeve 56 is then bonded to the interior surface of the lens cup 40 using adhesive. Thereafter, the pin member 24 is rotated until a relieved portion 72 is brought into proximity to the shim 70. In this position (as shown in FIG. 2a) it is possible to move the pin member 24 with the indicator sleeve 50 received about one end thereof in a downward direction until surface 68 of the sleeve 50 contacts surface 58 of sleeve 56. The relieved portion 72 thus accommodates the shim in order to permit the sleeves 50 and 56 to be brought into contact with one another.

It should be noted that any number of shims 70 may be used about the circumference of the surface 58 of sleeve 56 in order to define clearance 66 between the sleeves. It should also be noted that for each shim that is utilized it is necessary to provide a relieved portion 72 in sleeve 50 so that upon rotation of the pin member the relieved portions will become aligned with the shims permitting the sleeves to be brought into contact.

With the clearance 66 defined between sleeves 50 and 56 as shown in FIG. 2 (and with sleeve 56 fixed to lens cup 40) the interior space of the fluid holding member is filled with light-absorbing indicator fluid 64. Thereafter ring 60 is pressed into the lens cup until contact is made with sleeve 56. Excess fluid is allowed to be forced out of the fluid holding member between ring 60 and the stem of pin member 24. Thereafter retainer 62 is pressed into place and a compressive force is applied to ring 60 by means of the retainer. With an axial force being maintained on the retainer this element is then adhered and fixed to the interior surface of the lens cup in the position shown in FIG. 2.

Final assembly of the fastener is completed as the fluid holding member or capsule 30 (including pin member 24 extending therefrom) is inserted into a fastener that includes a bore 16 and a counterbore 18 as shown in FIG. 1. The first end 26 of the pin member 24 is secured to the wall defining bore 16 of the fastener by means of adhesive 38. The side wall 42 of the lens cup 40 is then secured to the wall defining counterbore 18 by means of adhesive 74 which is applied to either one or both of the surfaces of the lens cup and the wall defining counterbore 18.

The fastener including the indicator as shown in FIG. 2 is then ready for use. With the indicator areas 34 and 52 contacting the window 46 a circle and an annular ring of bright color are apparent to an observer indicating the unstressed condition of the bolt.

OPERATION

The operation of the fastener of this invention will now be described with reference to FIGS. 2–5.

When the fastener is taken up and placed in a stressed condition, it will elongate causing the indicator area 34 and indicator area 52 to separate from the window 46 as shown in FIG. 3. Light-absorbing indicator fluid 64 will flow between the indicator areas and the window causing a change in appearance of the color of the indicator areas. This change in appearance is essentially linear in proportion to the depth of film of light-absorbing indicator fluid. If the fluid is very opaque or of very high light-absorbing power a film thickness on the order of 0.001 inches is sufficient to change the appearance of the bright red-orange color of the indicator areas 34, 52 to the characteristic color of the fluid which, in the preferred embodiment, is a deep blue.

The strain at which the change of appearance effectively occurs can be well controlled by controlling the optical density or light-absorbing power of the fluid. It has been found in practice that the fastener can be calibrated to show the change in color of the indicator area within ten percent of a precalculated strain specification.

A slight elongation of the fastener during take-up which produces a gap between the pin member and the indicator sleeve 50 with respect to the window is elastic. Thus, the strain indicator is reversible and if the fastener should become loosened the bright colors of the indicator areas 34, 52 will become visible as these areas return to the position of FIG. 2 thereby providing warning of the loose condition.

In the preferred embodiment the light-absorbing indicator fluid 64 is a mineral oil in which has been dissolved a dye powder. Other fluid compositions should be considered within the spirit and scope of this invention.

To review, in the condition shown in FIG. 3 the fastener has undergone elastic stretch as the gap between the indicator surfaces 34, 52 and the internal surface 54 of the window does not exceed the clearance space 66 between the sleeves 50, 56. The clearance space 66 is premeasured (by means of shim 70 as has been previously noted) such that the axial or longitudinal dimension of the clearance space does not exceed the maximum design strain of the fastener material.

It should thus be understood that movement of sleeve 50 relative to sleeve 56 will be within the elastic range of the fastener material so long as these sleeves do not contact one another during take-up.

If, however, surface 68 of sleeve 50 should contact abutment surface 58 of sleeve 56 during take-up (as when the elastic limit of the fastener material is exceeded) a further downward movement of pin member 24 will cause sleeve 50 to move relative to the pin member 24. Stated in other words, at such time as sleeves 50, 56 contact one another during take-up any further downward movement of pin member 24 (i.e., downward with reference to FIG. 2) will not produce additional movement of sleeve 50 as this sleeve now abuts sleeve 56 which itself is firmly secured to the lens cup.

When take-up has been completed (the elastic limit of fastener material having been exceeded) the pin member 24 will assume a new position with respect to the sleeve 50. The configuration of the indicator in this condition is shown in FIG. 4. As will be apparent from FIG. 4 the indicator area 34 is no longer aligned with the indicator area 52. As a result the space between the pin member 24 and the window exceeds the space between the sleeve 50 and the window. The difference between the spaces so defined between the pin member, the sleeve and the window is directly proportional to the amount of strain imparted to the fastener after the elastic limit has been reached. Since the depth of fluid between the pin member and the window (as shown in FIG. 4) no longer is equal to the depth of fluid between the sleeve 50 and the window, the color observed through the window will be brighter at the sleeve 50 as compared to the pin member 24. The difference in the observed colors will be directly proportional to the degree of overload or overstretch of the fastener.

When the fastener as shown in the overload stress condition of FIG. 4 is loosened and caused to return to a nonstressed condition the sleeve 50 will return into contact with window 46 as indicator area 52 reestablishes contact with internal surface 54 of the window. This is shown in FIG. 5. However, the indicator area 34 of the pin member will not return into engagement with the internal surface 54 of the window as a plastic set has been established in the fastener.

The condition of an overstressed fastener which has been returned to a nonstressed condition is shown in FIG. 5. Indicator area 52 of sleeve 50 will present a brightly colored annular surface to an observer. However, since light-absorbing indicator fluid 64 will be trapped between indicator area 34 and the window the color of the indicator area 34 will be somewhat obscured. Thus the observer will notice a relatively dark circle surrounded by a brightly colored ring. This will present an indication that a bolt that has been once overstretched has now been loosened. The indicator further provides some degree of color differential in order that an observer can evaluate the degree of overload.

Thus the indicator as shown in FIG. 2 is capable of demonstrating several characteristics of a fastener.

First of all, as the fastener is taken up within the elastic limit of fastener material the indicator provides a quantative picture as to the amount of take-up as the coplanar indicator areas 34, 52 move in unison and the color change is proportional to strain or stretch.

The fastener also provides a positive visual indication at such time as the maximum design bolt load has been exceeded as there will become apparent a color change or a color difference between the indicator areas 34, 52. Indicator area 34 will become darker relative to indicator area 52 as the elastic limit is exceeded.

A still further feature of the indicator of this invention is that there is a positive visual indication in a bolt that is not loaded if that bolt at any time during its prior use has been exposed to excessive tensile forces resulting in the bolt having been loaded beyond its yield point. Thus there is presented (as shown in FIG. 5) a condition indicating that the bolt should not be put into use again as there is now permanent evidence that an overyield stress condition has been experienced in the bolt.

MODIFICATION OF THE INVENTION

A modification of the indicator of this invention will now be described with reference to FIGS. 6 and 7. Where possible common reference elements will be used in describing FIGS. 6 and 7 as were used in connection with the description of FIGS. 1–5.

Figure 7:
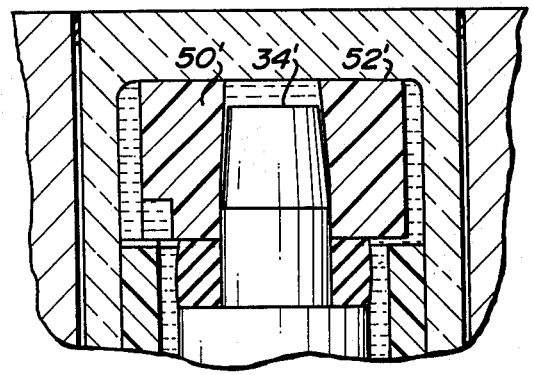
FIG. 7 is an enlarged fragmentary elevational cross-sectional view of the modified indicator portion of the apparatus of this invention as shown in FIG. 6 with the fastener in an unstressed condition with the elastic limit of the fastener having been exceeded during take-up.

The indicator shown in FIG. 6 includes a pin member 24' which includes a head portion 32' and a tapered end surface 80. Received about one end of the pin member 24' is an indicator sleeve 50' which includes a tapered surface 82 which is complementary to surface 80 of the pin member. An elastomeric ring 84 is disposed between head portion 32' and sleeve 50' such that when the elements are assembled as shown in FIG. 6 the ring 84 is compressed and tends to exert an upward bias against indicator sleeve 50'.

As in the embodiment of FIG. 2 the surfaces defining indicator areas 34', 52' of FIG. 6 are, in initial assembly of the indicator, essentially coplanar and as designed to contact the internal surface 54 of window 46 with the fastener in an unstressed condition.

The remaining elements of the indicator as shown in FIG. 6 are identical to corresponding elements of FIG. 2. An abutment sleeve 56 is positioned internally of the lens cup and is fixed to the side wall of the lens cup so as to define a clearance space 66 between the abutment sleeve and the indicator sleeve. A shim is used for this purpose during assembly as has previously been described. The interior space of the indicator of FIG. 6 is filled with a light-absorbing indicator fluid 64 which is retained within the capsule by means of ring 60. Ring 60' is, in turn, retained within the capsule by means of retainer 62.

In the operation of the indicator as shown in FIG. 6 take up of the fastener within the elastic range of fastener material will cause the indicator areas 34', 52' to pull away from the window 46 uniformly with the result that light-absorbing indicator fluid 64 is caused to flow between the indicator areas and the window. As take-up within the elastic limit of the fastener material proceeds the colors exhibited by the indicator areas 34', 52' will become progressively darker.

At such time as the maximum design bolt load has been reached the indicator sleeve 50' will contact the abutment sleeve 56. Further take-up of the fastener at this point will cause the indicator sleeve 50' to be released with respect to the pin member 24'. This releasing action occurs as the pin member 24' moves in a downward direction (with reference to FIG. 6) after contact of the indicator sleeve 50' has been made with respect to abutment sleeve 56. The locking taper at the interengaging surfaces 80, 82 is thus broken and the indicator sleeve 50' is free to move with respect to the pin member 24' as these members become disengaged. Since ring 84 is, in the configuration shown in FIG. 6, in compression as a result of the initial assembly of the indicator unit a release of the indicator sleeve 50' with respect to the pin member 24' will cause the indicator sleeve 50' to move in an upward direction with respect to FIG. 6 and to abut the internal surface 54 of the window. This condition, which occurs at such time as the maximum design load of the fastener has been exceeded, is shown in FIG. 7. Fluid between the indicator sleeve 50' and the window is, in the configuration of FIG. 7, forced from between these members with the result that the brightly colored indicator surface 52' is again visible. The indicator surface 34' of the pin member, however, is not visible as fluid is disposed between this surface and the window. In the condition shown in FIG. 7 indicator sleeve 50' will retain its position in contact with the window independent of any further downward movement of the pin member so long as the bias exerted by the ring 84 is present.

The indicator unit of FIG. 6 thus functions to provide a visual indication of both elastic take-up and take-up which exceeds the yield point of the bolt material.

During elastic take-up the indicator sleeve 50' and the pin member 24' retain their coplanar relationship with respect to each other. The visual indication of elastic take-up of the indicator of FIG. 6 is thus very nearly identical to that of the indicator as shown in FIG. 2.

If after take-up in the elastic range there should be a loosening of the fastener the elements will return to the position of FIG. 6. In this position the indicator shows not only that the fastener is in a loose or nonstressed condition but also that at no prior time has the fastener yield strength been exceeded.

The indicator of FIG. 6 further provides a positive sign of the yield strength of the fastener material being exceeded as the indicator sleeve 50' becomes separated from the pin member 24' producing an immediate return of the indicator sleeve 50' to its position immediately adjacent the window. Thus there is given an immediate indication during take-up of the maximum design limit of the bolt having been exceeded. There is further provided, however, a permanent indication that the fastener yield point has been exceeded as after loosening the indicator area 34' cannot return to its initial position in contact with the window 46. This is due to a permanent set in the fastener. Thus the difference in color between the indicator areas 34' and 52', after the yield strength has been exceeded, is permanent thus giving a positive visual indication that the bolt is not suitable for reuse.

The indicator of this invention can be assembled into virtually any type of strain member whether it be bolt, rod, or other machine element. Special fasteners and elements can readily be adapted to receive the indicator since it is basically a sub-assembly that can be joined to and made a part of any other unit.

It should be emphasized again that whereas the term strain indicator has been used throughout the description of this invention this phrase has been selected because a strain in a member produces movement of a pin member which produces an apparent color change to an observer. Since strain, stress and torque are interrelated, the apparatus of this invention may well be termed a stress indicator or a torque indicator. The use of the term strain indicator, thus, should not be considered as limiting the invention.

While in the preferred embodiment adhesive has been used to join the capsule and the pin member to the threaded fastener other means, known to those skilled in the art, should also be considered within the spirit of this invention.

What is claimed is:
1. An optical stress-strain indicator comprising in combination:
   a first member subject to stress-strain and having a head and a recess extending from said head into said member;
   a second member received within said first member and having a first end and a second end, said first end being secured to said first member;
   a fluid holding member having a window, said fluid holding member being secured to said first member with said window substantially adjacent said head so as to be visible;
   light-absorbing indicator fluid within said fluid holding member;
   a first indicator area in said fluid holding member disposed substantially adjacent said window;
   a second indicator area in said fluid holding member disposed substantially adjacent said window and substantially coplanar with said first indicator area;
   means independently operatively connecting said first indicator area and said second indicator area to said second end of said second member such that:
   a. as said first member undergoes an elastic change in length said second end of said second member is caused to move with respect to said window with the result that said first indicator area and said second indicator area become separated from said window an equal distance with the consequence that said fluid is caused to flow between said window and said first and second indicator areas;
   b. as said first member undergoes a further change in length exceeding the elastic limit of said first member, said first indicator area and said second indicator area move relative to each other and assume a non-coplanar relationship.

2. The invention of claim 1 in which said first indicator area is defined by a planar surface of said second end of said second member received within said fluid holding member.

3. The invention of claim 2 in which said second indicator area is defined by a planar surface of a generally annular member received about said second end of said second member.

4. The invention of claim 1 in which said first indicator area is maintained in coplanar relationship with said second indicator area in a non-stress condition of said first member, by means of releasable locking means.

5. The invention of claim 4 in which said first indicator area is defined by a planar surface of said second end of said second member and said second indicator area is defined by a planar surface of an annular member received about said second end of said second member and said releasable locking means is defined by a pressfit relationship of said annular member with said second end of said second member.

6. The invention of claim 5 in which said releasable locking means is actuated by the engagement of said annular member with a stop shoulder defined at the interior of said fluid holding member.

7. The invention of claim 6 in which said internal stop shoulder is defined by a generally annular ring secured to the internal wall of said fluid holding member.

8. The invention of claim 7 in which a predetermined clearance space is defined between said stop shoulder and said annular member which clearance face defines the elastic limit of the material from which said first member is fabricated.

9. The invention of claim 5 in which said releasable locking means is defined by complementary tapered surfaces defined by said annular member and said second member and said releasable locking means is actuated by engagement of said annular member with an internal stop shoulder of said fluid holding member.

10. The invention of claim 9 in which internal bias means is provided at said fluid holding member to move said annular member into engagement with said window at such time as said annular member is released from said second member.

11. The invention of claim 10 in which said internal bias means is defined by an elastomeric member disposed in a state of compression between said annular member and a shoulder of said second member.

12. The invention of claim 1 in which bias means is provided at said fluid holding member to bias said first and second indicator areas into said window with said first member in a non-stressed condition.

13. The invention of claim 12 in which said second member is provided with a shoulder and said bias means is defined by an elastomeric member disposed in a state of compression against said shoulder.

14. An optical stress-strain indicator comprising in combination:
 a first member subject to stress-strain and having a head and a recess extending from said head into said member;
 a second member received within said first member;
 a fluid holding member having a window, said fluid holding member being secured to said first member with said window substantially adjacent said head so as to be visible;
 light-absorbing indicator fluid within said fluid holding member;
 a first indicator area in said fluid holding member disposed substantially adjacent said window;
 a second indicator area in said fluid holding member disposed substantially adjacent said window and substantially coplanar with said first indicator area;
 bias means maintaining said first indicator area and said second indicator area in contact with the internal surface of said window with said indicator in a non-stress condition;
 means independently operatively connecting said first indicator area and said second indicator area to said second member such that:
 a. as said first member undergoes an elastic change in length said second member is caused to move with respect to said window with the result that said first indicator area and said second indicator area become separated from said window an equal distance with the consequence that said fluid is caused to flow between said window and said first and second indicator areas;
 b. as said first member undergoes a further change in length exceeding the elastic limit of said first member, said first indicator area and said second indicator area move relative to each other and assume a non-coplanar relationship.

15. An optical stress-strain indicator comprising in combination:
 a first member subject to stress-strain and having a head and a recess extending from said head into said member;
 a second member received within said first member;
 a fluid holding member having a window, said fluid holding member being secured to said first member with said window substantially adjacent said head so as to be visible;
 light-absorbing indicator fluid within said fluid holding member;
 a first indicator area in said fluid holding member;
 a second indicator area in said fluid holding member;
 means operatively connecting said first indicator area and said second indicator area to said second member;
 means providing for the equal movement of said first indicator area and said second indicator area as said first member undergoes an elastic change in length;
 means providing for the movement of one of said indicator areas relative to the other of said indicator areas as said first member undergoes a change in length exceeding the elastic limit of said first member.

16. The invention of claim 15 in which said first indicator area and said second indicator area are disposed in substantially a coplanar relationship with said stress-strain indicator in a non-stress condition.

17. An optical stress-strain indicator comprising in combination:
 a first member subject to stress-strain and having a head and a recess extending from said head into said member;
 a second member extending from said first member;
 a fluid holding member having a window, said fluid holding member being secured to said first member with said window substantially adjacent said head so as to be visible;
 light-absorbing indicator fluid within said fluid holding member;
 a first indicator area in said fluid holding member;
 a second indicator area in said fluid holding member;
 means independently operatively connecting said first indicator area and said second indicator area to said second member;
 means providing for the movement of at least one of said indicator areas as said first member undergoes an elastic change in length;
 means providing for the movement of one of said indicator areas relative to the other of said indicator areas as said first member undergoes a change in length exceeding the elastic limit of said first member.

* * * * *